UNITED STATES PATENT OFFICE.

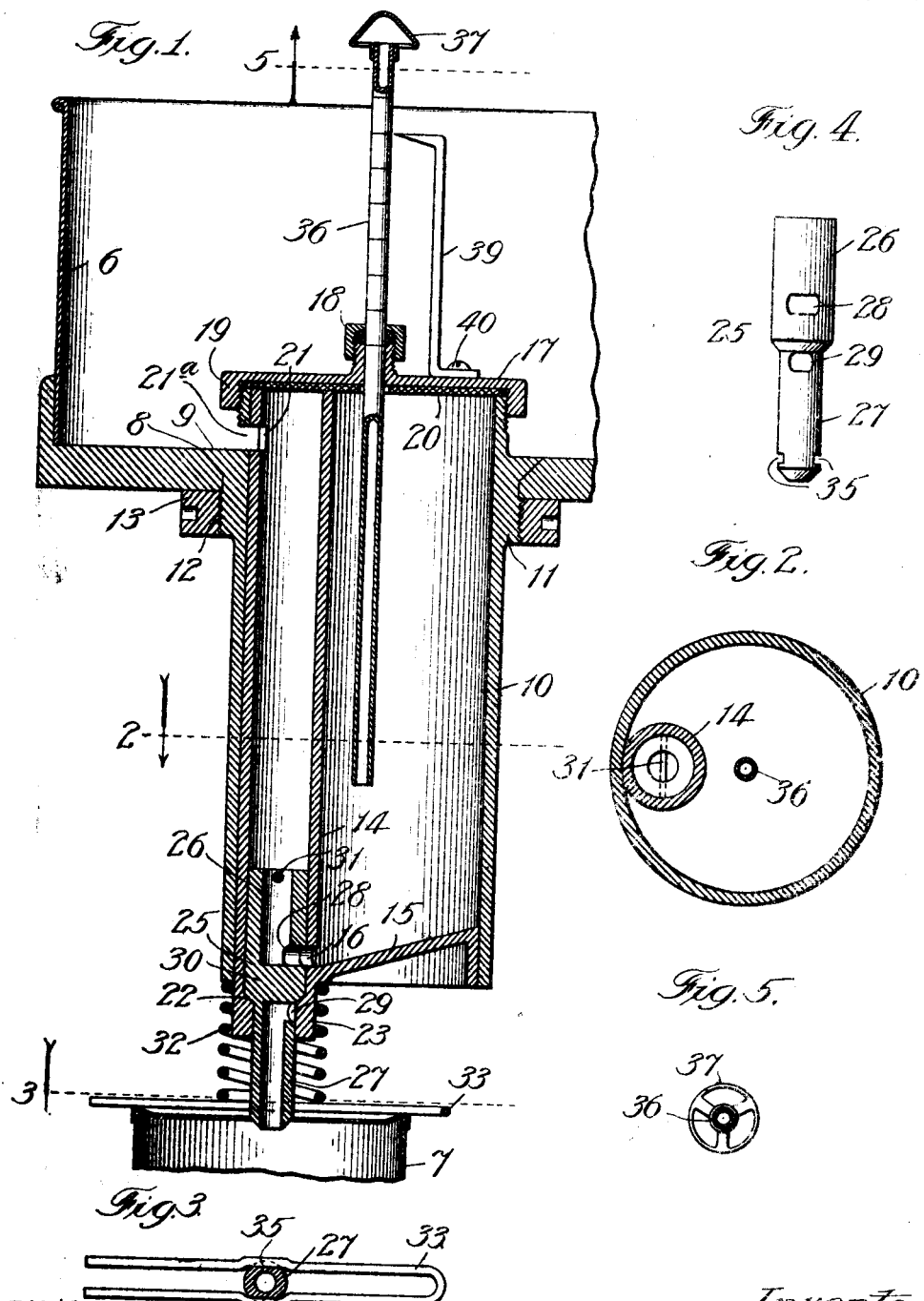

PHILO M. BLACKMAN AND WILLIAM MARSHALL, OF ELGIN, ILLINOIS.

FILLING APPARATUS FOR LIQUID-RECEPTACLES.

1,026,145.  Specification of Letters Patent.  Patented May 14, 1912.

Application filed February 15, 1911. Serial No. 608,777.

*To all whom it may concern:*

Be it known that we, PHILO M. BLACKMAN and WILLIAM MARSHALL, citizens of the United States, residing at Elgin, in the county of Kane and State of Illinois, have invented a new and useful Improvement in Filling Apparatus for Liquid-Receptacles, of which the following is a specification.

Our invention relates to an improvement in the class of filling apparatus used in a reservoir containing the supply of liquid (as syrup, milk or other beverage) from which bottles and other forms of receptacle are filled in measured quantity by operating the apparatus, which comprises, generally described, a liquid holder or trap communicating with the reservoir to be filled therefrom with a measured quantity of its contents and discharge the same through a valved outlet into a receptacle to be filled.

In the accompanying drawing, Figure 1 is a view in broken sectional elevation showing our improved filling apparatus in operative position in a tank or reservoir; Figs. 2 and 3 are sections taken, respectively, on the lines 2 and 3, Fig. 1; Fig. 4 is a view in elevation of the valve-device and Fig. 5 is a section on line 5, Fig. 1, through the measure-regulating tube.

A reservoir 6 is a usual part of a filling machine equipment in which the reservoir is provided with a plurality of depending valve-devices and is supported in elevated position over the part of a machine (not shown) on which receptacles to be filled, such as the receptacle shown at 7 in Fig. 1, are imposed to register with the valve-devices, whereby lowering the reservoir or raising the receptacles engages with the latter the valve-devices to open them and effect the filling.

Our improvement relates particularly to the valved and vented trap, of which only one is shown in the drawing, since they may all be alike if more than one be employed.

The bottom of the reservoir contains an opening forming about its inner-end portion a downwardly-tapering seat 8. In this seat fits a correspondingly-shaped flange 9 about the trap 10 or measuring-chamber, which is preferably a cylindrical casing having formed about it, below its upper end, a circumferential enlargement 11 provided with a screw-thread 12 upon which to screw a nut 13 to bear against the tank-bottom and tighten the trap in its seat. The trap, which thus projects for a short extent of its length into the reservoir through its bottom, contains a vertical filling-tube 14 which is rigid against the inner surface of the trap-wall, being preferably formed as an integral part of the trap-bottom 15 which inclines to a discharge-port 16 in the tube. The cover 17 of the trap, which is provided centrally with a stuffing-box 18, for the purpose hereinafter stated, screws at its internally-threaded circumferential flange 19 about the upper threaded end of the trap against a gasket 20 to hermetically seal the upper end of the tube 14 as well as the trap. This tube contains an inlet-port 21 registering with a similar port 21ª in the wall of the trap adjacent to the reservoir-bottom; and the lower end of the tube, which protrudes beyond the trap bottom 15, is internally thickened at 23 and provided with a beveled shoulder 22 forming a ground seat for the valve 25. The valve comprises an upper tubular guiding section 26 fitting the diametrically-larger section of the tube 14, which forms the valve-casing, and containing a port 28 to register with the port 16, and a narrower tubular section 27, fitting the thickened tube-section 23 and open at its lower end and containing a lateral port 29 in its upper end. The two valve-sections are separated from each other by an interposed head 30 beveled about its lower end to fit the seat 22. The normal position of the valve, which is provided in the upper end of its section 26 with a cross-pin 31 for the application of any suitable hooked implement by which to withdraw the valve out of the upper end of the tube 14, when uncovered, as for cleaning or repairing it, is against its seat; and in that position the port 28 registers with the port 16, and the port 29 is closed. A spiral spring 32 is confined about the valve-section 27 between the bottom of the trap and a fork-like stop 33 containing a central expanded section 34 at which it embraces the last-named valve-section at opposite external grooves 35 provided in it. A vent-tube 36 is supported in the stuffing-box 18 to depend in the trap 10 and adapt it to be vertically adjustable therein, the tube terminating at its outer end in a shielding-cap 37 and being shown to be provided with gagemarks 38 to register with an index-finger 39 fastened at 40 to the cover or head 17.

With the parts in the relative positions in which they are represented in Fig. 1, and the reservoir containing a supply of the liquid for filling packages 7, part of such liquid will have flowed through the ports 21ª and 21, the tube 14 and the ports 28 and 16 into the trap 10, to such height therein as is determined by the distance to which the tube 36 extends into the trap. This tube is intended for gaging the quantity of liquid which enters the trap in accordance with the capacity of the receptacle 7 being filled in the operation of the apparatus on a run of packages of the same capacity, such as half-pints, pints, quarts, and so forth; and for determining which quantity shall be admitted to the trap to be discharged therefrom by operating the valve 25 as hereinafter described, the tube 36 is set with reference to the proper mark on the gage being brought coincident with the pointer 39. The liquid which thus enters the trap will rise therein only to or very slightly above the lower end of the gage tube, being prevented from rising to a higher level therein by the air-pressure in the air-tight trap, though part of the liquid so introduced will rise above the level in the tube 36, and the quantity of that part is included in the measured quantity for filling the respective capacity of receptacle 7. The filling ensues from raising the valve 25 to close the port 28 by taking it out of registration with the port 16, thereby to close the trap to the reservoir and register the port 29 with the port 16, when the contents of the trap discharge through the valve-section 27. This discharge-operation is produced by the act of pressing (as by actuating the machine referred to) the top of a receptacle 7 upwardly against the stop 33 to raise the valve from its seat to its discharging position, thereby also compressing the spring 32 to cause it, when released by withdrawing the filled receptacle, to seat the valve and thus restore the apparatus to normal condition.

It will be observed that the extent of separation of the valve ports 28 and 29 is such as to cause the port 28, in the upward movement of the valve, to clear the trap-port 16 before the port 29 registers therewith. This is an important provision for the measuring function of the apparatus, since it shuts off the flow from the reservoir into the trap before the discharge from the latter can begin and thus avoids inaccuracy in the measurement which would otherwise result. The inclination of the trap-bottom 15 toward the port 16 is another important feature of our apparatus in causing the discharge of the entire contents of the trap. Moreover, the construction, which is very simple, affords such a relation of the parts (valve and filling-tube, and trap and reservoir) as to enable them to be readily taken apart for cleaning, thereby facilitating a frequent requirement in that behalf, particularly when the apparatus is used for milk.

What we claim as new, and desire to secure by Letters Patent, is—

1. In a filling apparatus of the character described, the combination with a reservoir, of a measuring trap depending therefrom having a port in its lower end, a filling tube in said trap having a port in its upper end open to the reservoir, and provided with a port near its lower end whereby liquid from the reservoir may flow through said filling tube into the trap, a double-ported reciprocating valve seated in said tube and having one of its ports registering, in the seated position of the valve, with the trap-port and its other port registering with said trap-port in the raised position of the valve, said valve ports being in such spaced relation to each other and to the trap port as to close the trap to one before registering, the other therewith as the valve is moved to its different positions, and means in the trap to vent the same.

2. In a filling apparatus of the character described, the combination with a reservoir, of a measuring trap depending therefrom having a port in its lower end, a filling tube in said trap having a port in its upper end open to the reservoir, and provided with a port near its lower end whereby liquid from the reservoir may flow through said filling tube into the trap, a double-ported reciprocating valve seated in said tube and having one of its ports registering, in the seated position of the valve, with the trap-port and its other port registering with said trap-port in the raised position of the valve, said valve ports being in such spaced relation to each other and to the trap port as to close the trap to one before registering the other therewith as the valve is moved to its different positions, engageable means carried by the valve whereby the same may be removed for cleansing, and means in the trap to vent the same.

3. In a filling apparatus of the character described, the combination with a reservoir, of a depending measuring-trap, a vertical filling-tube in the trap open near its upper end to the reservoir and having an internally-thickened lower end protruding through the trap-bottom and forming a valve-seat, a port in said tube above the valve-seat and opening into the trap, and a valve having an upper section and a lower tubular section separated by an interposed seating-head and containing a port in the upper section registering with said tube-port in the seated position of the valve and a port in the lower section registering with the trap-port in the raised position of the valve, said valve being withdrawably contained in the tube.

PHILO M. BLACKMAN.
WILLIAM MARSHALL.

In presence of—
 CHAS. A. DAVIS,
 R. L. SEAMAN.